No. 827,581.  
PATENTED JULY 31, 1906.  
H. D. TERRELL.  
COFFEE PACKAGE.  
APPLICATION FILED JUNE 3, 1905.
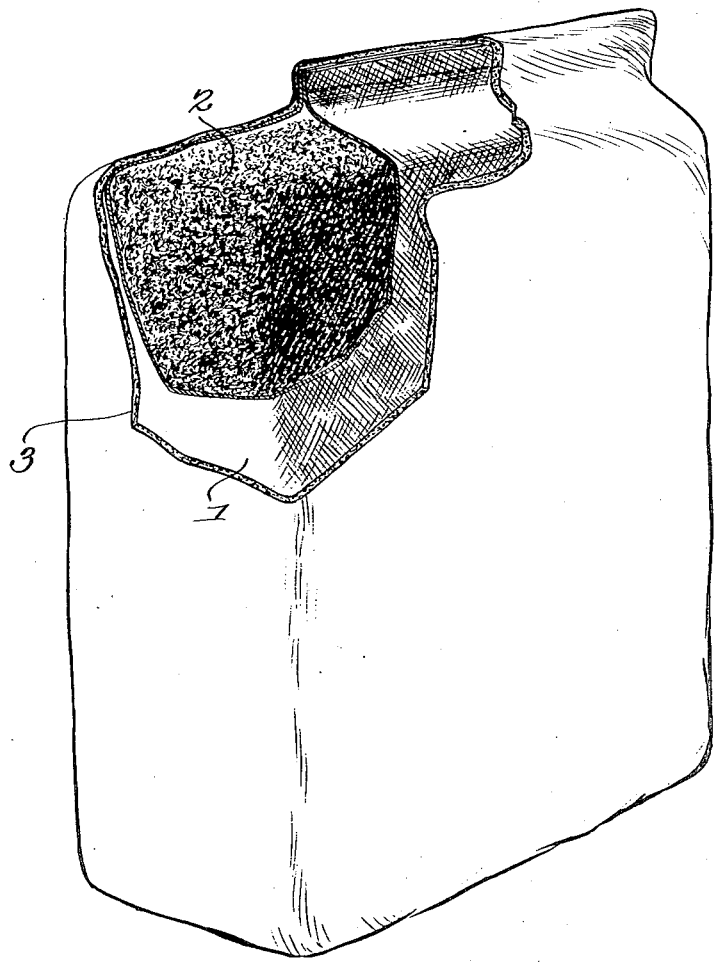
Witnesses:
Henry D. Terrell, Inventor,
by C. A. Snow & Co.  
Attorneys.

UNITED STATES PATENT OFFICE.

HENRY DENTON TERRELL, OF ATLANTA, GEORGIA.

COFFEE-PACKAGE.

No. 827,581.  Specification of Letters Patent.  Patented July 31, 1906.

Application filed June 3, 1905. Serial No. 263,613.

*To all whom it may concern:*

Be it known that I, HENRY DENTON TERRELL, a citizen of the United States, residing at Atlanta, in the county of Fulton and State of Georgia, have invented a new and useful Coffee-Package, of which the following is a specification.

This invention relates to a coffee-package.

The objects of the invention are in a ready, simple, thoroughly feasible, and practical manner indefinitely to preserve ground or pulverized coffee, positively to obviate the formation of dregs or grounds in the coffee made from the article, to effect a material saving in the amount of quantity of coffee used, and to retain the full flavor and aroma of the coffee.

With the foregoing and other objects in view the invention consists of certain novel features of construction and combinations of parts, which will be hereinafter more fully described, and pointed out in the claims.

In the accompanying drawing, forming a part of this specification, and in which like characters of reference indicate corresponding parts, the figure is a view in perspective, partly in section, exhibiting a package of coffee prepared according to the present invention.

In the formation of these packages fabric bags are employed, which may be made of any suitable textile material and of any size, but preferably graded as to the quantity they will hold in order to provide for the making without waste of any quantity of coffee from a cupful to any amount. The bag 1 will be of the usual form—say that of a tobacco-bag—and into this is filled the ground or pulverized coffee 2, after which the mouth of the bag is sewed, thereby preventing any escape of coffee. The package thus prepared is then treated with a substance that will preclude air and moisture, but will not detract in the least from the flavor of the coffee made from the article thus presented.

Various materials may be utilized for forming the coating 3 on the bag, the substance employed in this instance being molten sugar, into which the bag is wholly immersed, thereby positively closing all the pores, and thus sealing the contained coffee against the deteriorating effects of moisture and air, and the package 6 thus prepared when stored in a dry place will retain the aroma of the coffee indefinitely. When liquid coffee is to be made, boiling water in sufficient quantity is taken, and into this is dropped the required amount of coffee, which may be one or more of the packages, whereupon the protecting-envelop 3 will dissolve, and thus allow the water to percolate through the interstices of the bag and into direct contact with the coffee contained thereby. The bag will generally be made of a textile material that will be of sufficiently fine mesh to prevent the escape of any of the ground coffee outward into the coffee-pot or urn, so that while the full flavor of the coffee will be extracted the formation of dregs or grounds will positively be precluded.

The procedure herein defined is cheap, thoroughly practical, and may readily be carried into effect without the employment of any particular kind of machinery for the purpose.

The coffee thus prepared may be kept indefinitely, and its aroma will not in the least deteriorate. Of course it will be preferable that the packages containing the coffee be retained in a dry state, otherwise the coating or envelop of sugar may become sticky and might adhere; but even this contingency may be met and the value of the packages enhanced by inclosing it in a wrapper of paraffin-paper or other waterproof material which will resist the action of moisture.

Having thus described the invention, what is claimed is—

1. As a new article of manufacture, coffee permanently contained in a holder of textile fabric coated with molten sugar.

2. A coffee-package consisting of a closed bag of sufficient permeability to act as a filter for the coffee contained therein and coated with an edible air-excluding coating soluble in water.

In testimony that I claim the foregoing as my own I have hereto affixed my signature in the presence of two witnesses.

HENRY DENTON TERRELL.

Witnesses:
CLIF. W. ANSLEY,
EDMUND H. MARTIN.